(12) United States Patent
Haftka et al.

(10) Patent No.: US 7,049,382 B2
(45) Date of Patent: *May 23, 2006

(54) ACTIVATED CARBON FILTER

(75) Inventors: Stanislaw Haftka, Wesel (DE); Jens Ehlers, Hamminkeln (DE); Christiane Barth, Oberhausen (DE); Louis Wang, Missouri City, TX (US)

(73) Assignee: Ticona GmbH (DE)

( * ) Notice: Subject to any disclaimer, the term of this patent is extended or adjusted under 35 U.S.C. 154(b) by 26 days.

This patent is subject to a terminal disclaimer.

(21) Appl. No.: 10/855,749

(22) Filed: May 27, 2004

(65) Prior Publication Data

US 2005/0004299 A1   Jan. 6, 2005

Related U.S. Application Data

(63) Continuation of application No. 09/787,864, filed on Jul. 12, 2001.

(60) Provisional application No. PCT/EP99/07086, filed on Sep. 23, 1999, now Pat. No. 6,770,736.

(30) Foreign Application Priority Data

Sep. 25, 1998 (DE) ................................ 198 44 167

(51) Int. Cl.
*C08F 210/16* (2006.01)
*B01D 24/00* (2006.01)
*B01D 39/00* (2006.01)
*C08L 3/04* (2006.01)

(52) U.S. Cl. ...................... 526/348; 526/352; 524/495; 210/500.36; 210/500.1; 210/502.1

(58) Field of Classification Search ................ 524/495, 524/570, 848, 847; 428/401; 526/348, 352; 210/500.1

See application file for complete search history.

(56) References Cited

U.S. PATENT DOCUMENTS

| 4,267,146 A | | 5/1981 | Kurtz et al. ................ 264/564 |
| 4,276,179 A | * | 6/1981 | Soehngen .................... 210/679 |
| 4,311,752 A | | 1/1982 | Diedrich et al. ............. 428/220 |
| 4,482,687 A | * | 11/1984 | Noshay et al. ........... 526/124.4 |
| 4,713,205 A | | 12/1987 | Su ........................... 264/176.1 |
| 5,338,589 A | | 8/1994 | Bohm et al. ............... 428/36.9 |
| 5,817,263 A | | 10/1998 | Taylor ........................ 264/113 |

* cited by examiner

*Primary Examiner*—David W. Wu
*Assistant Examiner*—Rip A. Lee
(74) *Attorney, Agent, or Firm*—Connolly Bove Lodge & Hutz LLP

(57) ABSTRACT

The present invention relates to a novel polymer as binder for producing activated carbon filters. The polymer of the invention is a polyethylene homopolymer and/or copolymer having a melt flow index (MFI 190/15) of from 1.2 g/10 min to 10 g/10 min, a polydispersity $M_w/M_n$ of from 3 to 30, a bulk density of from 0.05 g/cm³ to 0.5 g/cm³ and a particle size from 5 μm to 300 μm.

4 Claims, 3 Drawing Sheets

ACTIVATED CARBON FILTER

CROSS REFERENCE TO RELATED APPLICATIONS

Figure 1:
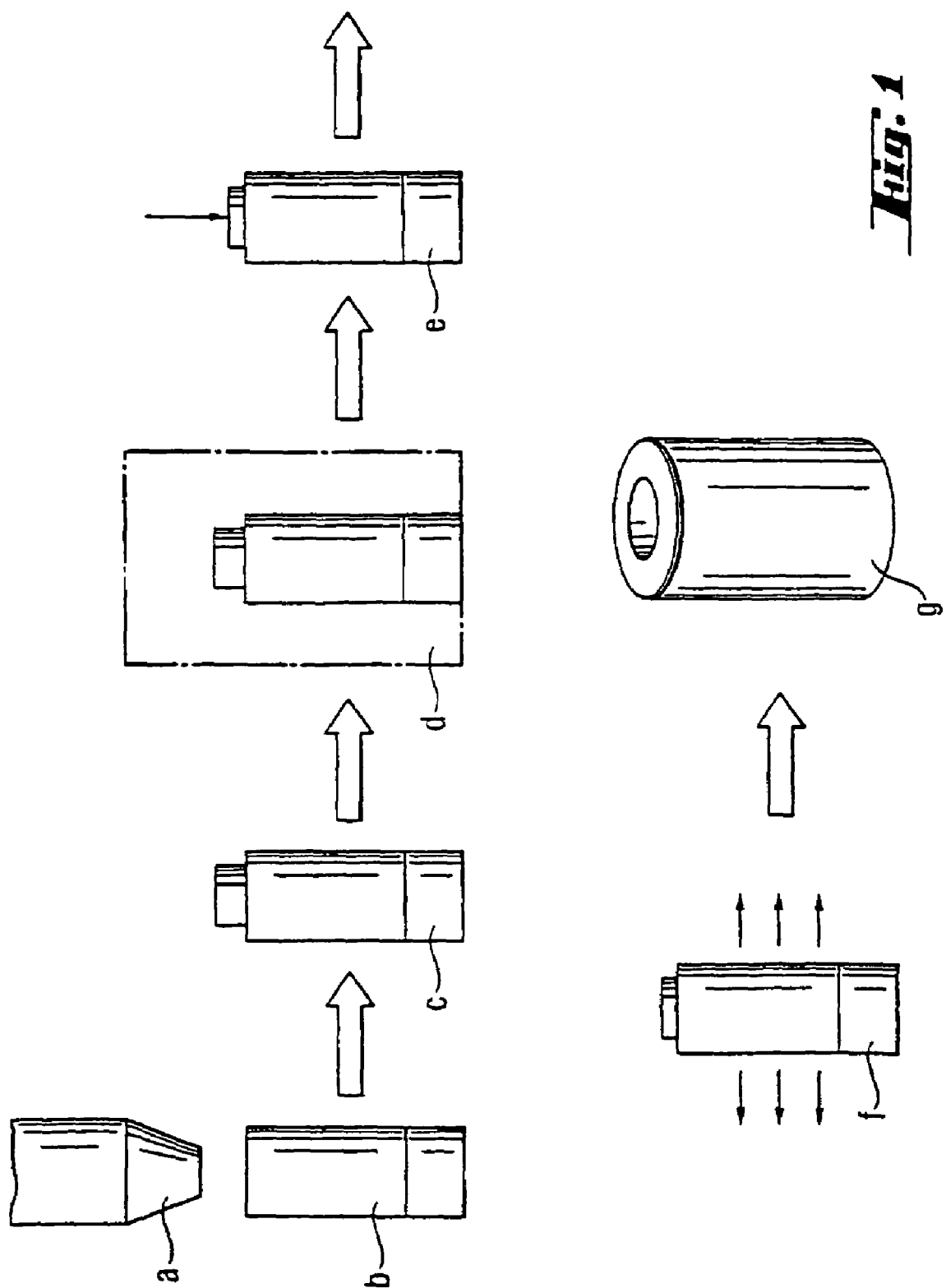

The present application is a continuation of application Ser. No. 09/787,864 now U.S. Pat. No. 6,770,736, filed Jul. 12, 2001.

The present invention relates to a novel polymer as binder for producing activated carbon filters.

Purification filters for purifying liquids or gases are known. In one group of such filters, a loose bed of grains of an adsorbent material such as activated carbon is located between two porous walls which confine the grains, see DE-A-32 04 022. Since there is no cohesion within the granular material, the flow and filter use period are difficult to control. In the flow of the filtrate and as a result of fracturing, relocation of various particle size fractions or washing out or local blockages caused by fines can occur. However, in particular, the adsorbency of the granular material resulting from internal porosity of the grains is effective only to a small extent since most of the filtrate flows past the filter material through the interstices between the grains and essentially contacts only the surface of the grains. Filter units of this type, also known as filter cartridges or filter candles, have to be replaced after a short period of use or the granular material has to be replaced.

Another filter employed for purifying tap water and containing an adsorptive shaped body as filter unit is known from EP-A-0 253 132. The shaped body is configured as a self-supporting sintered body and comprises finely divided adsorbent and thermoplastic binder. During production of the sintered body by thermoplastic sintering, a considerable part of the particle surfaces and micropores of the adsorbent is conglutinated or blocked by adhering and penetrating thermoplastic material; the corresponding internal surface area of the grains is thus lost for adsorption. As a result, the adsorption capacity of the overall filter unit is impaired.

EP-A-0 554 223 discloses a process for producing a filter unit. The high viscosity of the binder results in a lower strength of the filter unit obtained. inhomogeneous distribution. The inhomogeneous distribution in the mixture leads to a fragile product. In addition, the surface area of the activated carbon is decreased by the binder. The consequence is a drop in the filter capacity.

U.S. Pat. No. 4,753,728 discloses an activated carbon filter block which contains activated carbon particles which are bound by a polymer to give a filter block. The polymer has a melt flow index of less than about 1 gram per 10 minutes determined by STM D 1238 at 190° C. and 15 kilogram load. The polymer becomes tacky at elevated temperature. The polymer is not sufficiently fluid to substantially moisten the activated carbon particles. A commercially available polymer GUR® 212 is disclosed which has a melt flow index of less than 0.1 gram per 10 minutes determined by STM D 1238 at 190° C. and 15 kilogram load, and is an ultrahigh molecular weight polyethylene.

It is an object of the present invention to provide a binder for producing activated carbon filters which have a high strength and low binder content and in which the activated carbon is not coated.

The object of the present invention is achieved by a polyethylene homopolymer and/or copolymer having a melt flow index (MFI 190/15) of from 1.2 g/10 min to 10 g/10 min, a polydispersity $M_w/M_n$ of from 3 to 30, a bulk density of from 0.05 g/cm$^3$ to 0.5 g/cm$^3$ and a particle size from 5 μm to 300 μm.

The binder of the invention has a very good biocompatibility. The binder has a high viscosity, low tendency to coat the activated carbon, high porosity and low sensitivity for the process. The binder has a low bulk density and high surface area, a particular morphology and a particle size from 100 μm to 140 μm. The binder displays a particularly good thermal stability.

A filter unit produced using the binder of the invention achieves a high adsorbency of the activated carbon and has a very porous structure.

Possible binders according to the invention are organic, thermoplastic materials. A particularly suitable binder has been found to be a powder of a high or ultrahigh molecular weight thermoplastic, in particular polyethylene, which on heating is capable of binding in a viscous transition phase and forms porous structures with activated carbon in the sintering process.

After sintering, a block of activated carbon having a high adsorbency and good mechanical strength is obtained. A high filtrate flow is made possible by the high porosity.

Purification filters can be built as required using one or more such filter units. Applications are envisaged in the fields of process water treatment, wastewater purification, drinking water treatment, in the beverages, food and chemical industry, but also for purifying gases.

A preferred embodiment of the invention is a polyethylene homopolymer and/or copolymer having a melt flow index (MFI 190/15) of from 1.2 g/10 min to 10 g/10 min, a polydispersity $M_w/M_n$ of from 3 to 10, a bulk density of from 0.1 g/cm$^3$ to 0.5 g/cm$^3$ and a particle size from 60 μm to 200 μm. This binder gives an activated carbon filter having a high strength and a low binder content. The melt flow index is preferably 1.3 g/10 min to 10 g/10 min.

A further preferred embodiment of the invention is a polyethylene homopolymer and/or copolymer having a melt flow index (MFI 190/15) of from 1.4 g/10 min to 5 g/10 min, a polydispersity $M_w/M_n$ of from 4 to 8, a bulk density of from 0.13 g/cm$^3$ to 0.3 g/cm$^3$ and a particle size from 80 μm to 180 μm. This binder gives an activated carbon filter having a particularly high strength and a low binder content.

A particularly preferred embodiment of the invention is a polyethylene homopolymer and/or copolymer having a melt flow index (MFI 190/15) of from 1.4 g/10 min to 3 g/10 min, a polydispersity $M_w/M_n$ of from 4 to 8, a bulk density of from 0.15 g/cm$^3$ to 0.28 g/cm$^3$ and a particle size from 80 μm to 160 μm. This binder gives an activated carbon filter having a very particularly high strength and a low binder content.

A further embodiment of the invention is a filter material comprising polyethylene homopolymer and/or copolymer and activated carbon.

In the case of purification filters based on activated carbon for purifying drinking water, a distinction is made between two main groups. In the first and older variant, the loose activated carbon is placed in a porous container. Here, there is no cohesion within the granular material. As a result, the flow and filter properties are difficult to control. The adsorbency of the granular material is effective to only a small degree. The filtrate can flow past the filter material through the interstices between the grains and thus the active surface area of the activated carbon cannot be fully utilized.

A further disadvantage of these filters is that they very quickly become contaminated by bacteria. The activated carbon grains are an excellent nutrient medium for bacteria. In addition, such filters have a purely adsorptive action. The mechanical filtration properties are poor or nonexistent.

The second possibility is to form the filter as a sintered body. This is achieved by mixing finely divided adsorbent, viz. activated carbon, with a thermoplastic and consolidating this mixture in a mold by thermoplastic sintering. Here, the thermoplastic acts as an adhesive. It blocks a considerable part of the surface of the activated carbon grains and thus greatly reduces the active surface area of the activated carbon. The adsorption properties of these filters are low.

The filter block of the invention is produced by a process which gives strong shaped bodies having high adsorptive properties and very good mechanical filtration properties. This filter is produced by dry mixing very fine activated carbon with a high molecular weight polyethylene. The mixture is introduced into a mold and heated in the absence of air to a temperature which is significantly above the melting range of the binder. At these temperatures, the binder melts slowly. The process steps of dry mixing, introduction into the mold, compaction, heating according to a time program and demolding can also be carried out in mass production.

The filter obtained is a strong self-supporting body which can have filter finenesses down to below 1 µm and high adsorptive properties. The adsorptive properties of the activated carbon are not reduced by conglutination with the thermoplastic. The filter block provides a filter cartridge having very good mechanical filtration properties and very high adsorptive properties.

Owing to its filtration properties, the filter block is suitable for removing a wide variety of substances from water or aqueous solutions. The resulting filters having a filter fineness of <1 µm–10 µm can reduce the amount of sand, rust, dirt and lime particles and also asbestos fibers by filtration. Organic pollutants such as CFCs, pesticides (atrazine, DDT and lindane) and PAHs can be retained by adsorption.

Compared to loose-packed activated carbon filters, the uptake capacity is increased by a factor of 4.5. There is also a purification capability in respect of inorganic heavy metals. The filter can remove large amounts of cadmium, iron, lead and copper. Since these heavy metals can have adverse effects on the health of small children even in concentrations which are still permitted, a reduction in these substances is very important for a filter system.

Bacterial and viral contamination present a great problem in water for human consumption. In many parts of the world, chlorine is added to drinking water as a disinfectant. Although this substance is not poisonous in small amounts, it does have a strong adverse effect on the taste of the water. The filter block effects virtually complete catalytic removal of the chlorine present.

The performance of the domestic filters are directed first and foremost at removing a wide variety of pollutants from drinking water. Depending on the application, it is possible to select the appropriate filter fineness. The filters can be used for removing dirt, organic and inorganic substances and a bad odor or taste. If bacteria are to be removed from drinking water, fine filters having filter finenesses of 0.5 µm or 0.3 µm have to be selected. The flow performance of the filters varies with filter fineness.

A preferred embodiment of the invention is a filter material comprising from 1% by weight to 50% by weight of polyethylene homopolymer and/or copolymer and from 50% by weight to 99% by weight of activated carbon.

A particularly preferred embodiment of the invention is a filter material comprising from 5% by weight to 40% by weight of polyethylene homopolymer and/or copolymer and from 60% by weight to 95% by weight of activated carbon.

A very particularly preferred embodiment of the invention is a filter material comprising from 8% by weight to 30% by weight of polyethylene homopolymer and/or copolymer and from 70% by weight to 92% by weight of activated carbon.

A further embodiment of the invention is a filter material which further comprises additives.

A further embodiment of the invention is the use of a polyethylene homopolymer and/or copolymer as binder for filter materials comprising activated carbon.

Different structural forms are also conceivable for the purification filter. In the production process, variations in the process steps are possible. Thus, the filter unit of the mechanical fine filter depends on the respective application or the minimum size of the solid particles present in the filtrate. In the case of the fine filter, the critical factor is that such particles do not reach the adsorption body and block it. In place of sinterable, pulverulent plastic, it is also possible to use other materials for the fine filter or for the supporting walls, for example porous ceramic.

If particular requirements in respect of the sterility of the filtrate have to be met, the fine filter or both supporting walls can be impregnated with a bacteriocide such as finely divided silver. Other organic binders are also conceivable for the adsorption body. The mixing procedure and, in particular, the temperatures during low-temperature carbonization and sintering depend on the binder. The important thing is that, in the final state of the shaped body produced, the pores of the granular adsorbent are not blocked by the binder or at most blocked only to a slight degree.

The invention is illustrated by means of a drawing and examples.

DRAWING

The drawing includes three scanning electron micrographs.

FIG. 1 shows the process steps (a) dry mixing, (b) introduction into a mold, (c) closing the mold, (d) heating according to a time program and demolding as sintered bodies, (e) compaction, (f) cooling and (g) removal. Finely divided activated carbon is mixed with a thermoplastic and the mixture is consolidated in a mold by thermoplastic sintering and demolded as sintered bodies.

Figure 2:
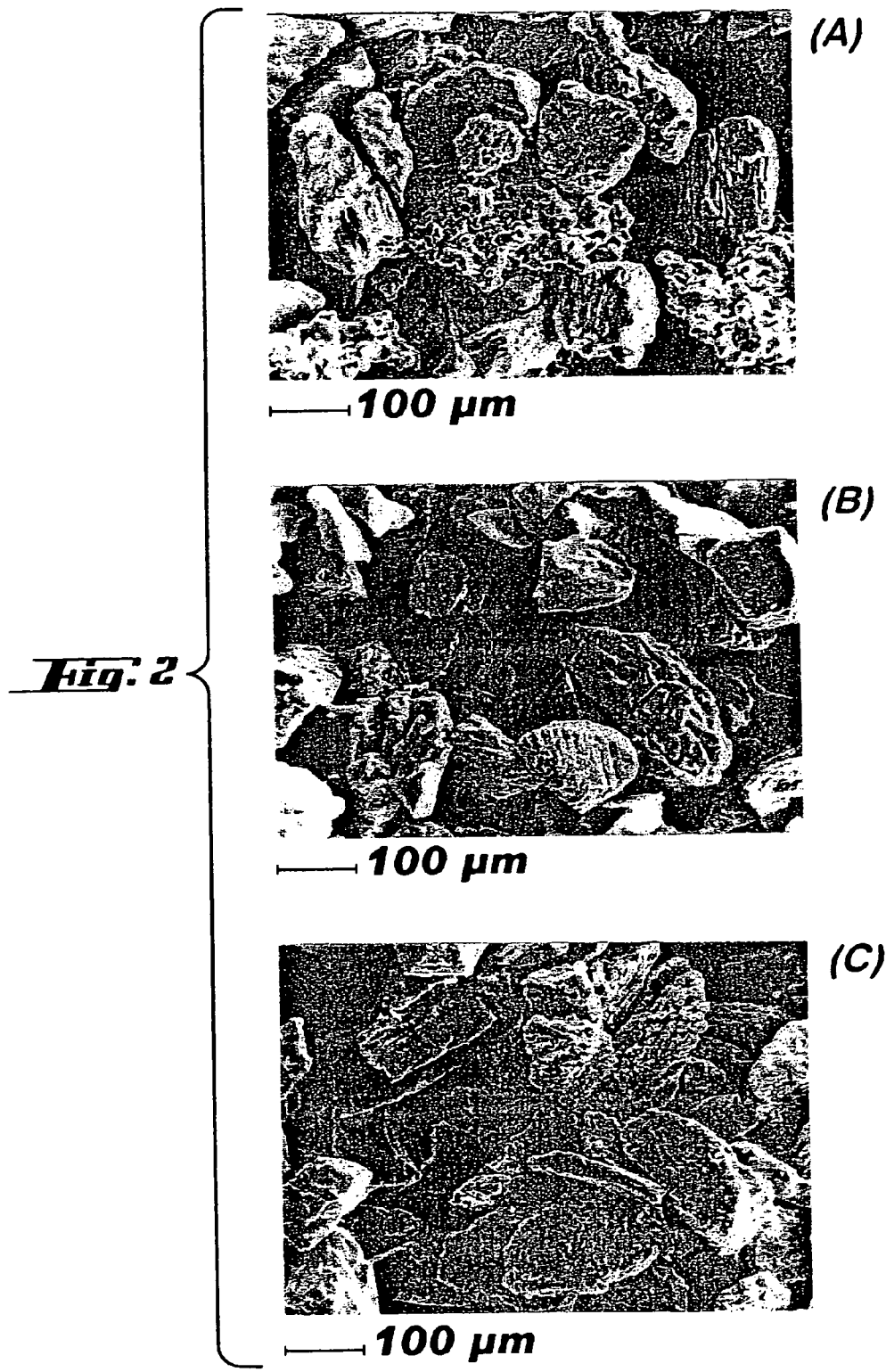

FIG. 2 shows three scanning electron micrographs. All three figures depict filter blocks, viz. (A) activated carbon with GUR® 2122, (B) activated carbon with GUR® 2105 and (C) activated carbon with HDPE. In (A), it is possible to see not only activated carbon particles but also intact GUR® 2122 with unchanged morphology. (B) shows a filter comprising the binder material GUR® 2105 according to the invention. Owing to the slight flow of the binder, the initial morphology is no longer present. The high viscosity of the binder leads to considerable bridge formation between the activated carbon particles. Coating of the activated carbon particles by the binder is not observed. (C) depicts a non-bonded region of the activated carbon. Owing to the high flow of the binder, e.g. HDPE, EVA, LDPE or similar bonds, the binder is inhomogeneously distributed in the filter block. Despite a high binder concentration in the filter block, no binder is observed in the region depicted. Owing to the inhomogeneous distribution, the filter is brittle.

Figure 3:
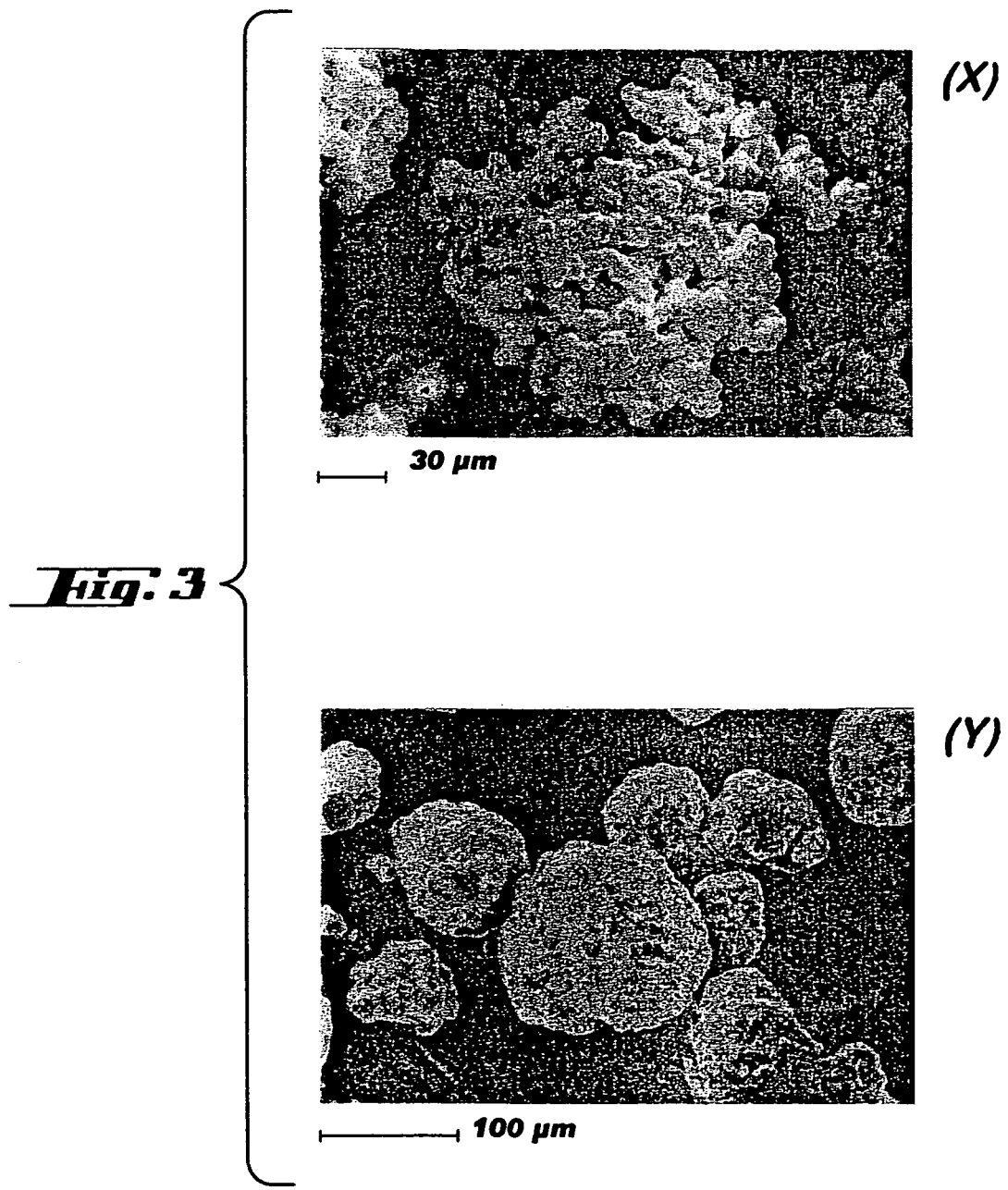

FIG. 3 shows two scanning electron micrographs. (X) shows the binder material GUR® 2105 according to the invention. The binder has a high porosity and specific morphology. These properties clearly distinguish the binder of the invention from customary binder materials such as HDPE, LDPE, EVA and others. (Y) shows, by way of example, a typical UHMWPE powder. The customary material (Y) depicted has a compact structure and is less suitable for producing highly porous bodies.

EXAMPLES

Example

Three samples of a filter block were made as shown in FIG. 1 using the compositions as described in FIG. 2. The first filter block comprising activated carbon and GUR® 2105 corresponds to the binder of the invention and the filter material of the invention. For comparison, samples of activated carbon with GUR® 2122 and activated carbon with HDPE were made as comparisons. Table 1 below compares the results obtained for the properties of samples.

TABLE 1

| Components | Composition [%] | Pressure drop [mbar] | APS [μm] | Properties |
| --- | --- | --- | --- | --- |
| GUR ® 2105 | 25 | 12 | 16 | high adsorbency |
| Activated carbon | 75 | | | high strength |
| GUR ® 2122 | 25 | 17 | 16 | high adsorbency |
| Activated carbon | 75 | | | low strength |
| HDPE | 25 | 26 | 11 | low adsorbency |

TABLE 1-continued

| Components | Composition [%] | Pressure drop [mbar] | APS [μm] | Properties |
| --- | --- | --- | --- | --- |
| Activated carbon | 75 | | | low strength brittleness |

The invention claimed is:

1. A filter material comprising a polyethylene copolymer having
   a melt flow index (MFI 190/15) of from 1.4 g/10 min to 3 g/10min,
   a polydispersity $M_w/M_n$ of from 4 to 8,
   a bulk density of from 0.15 g/cm$^3$ to 0.28 g/cm$^3$ and
   a particle size from 80 μm to 160 μm, and activated carbon.

2. A filter material as claimed in claim 1 comprising from 1% by weight to 50% by weight of polyethylene copolymer and from 50% by weight to 99% by weight of activated carbon.

3. A filter material as claimed in claim 1 comprising from 5% by weight to 40% by weight of polyethylene copolymer and from 60% by weight to 95% by weight of activated carbon.

4. A filter material as claimed in claim 1 comprising from 8% by weight to 30% by weight of polyethylene copolymer and from 70% by weight to 92% by weight of activated carbon.

* * * * *